United States Patent
Carr et al.

(10) Patent No.: US 8,154,734 B2
(45) Date of Patent: Apr. 10, 2012

(54) OPTICAL INTERFEROMETRIC SENSOR

(75) Inventors: Dustin Wade Carr, Albuquerque, NM (US); Gregory Robert Bogart, Corrales, NM (US)

(73) Assignee: Symphony Acoustics, Inc., Rio Rancho, NM (US)

( * ) Notice: Subject to any disclaimer, the term of this patent is extended or adjusted under 35 U.S.C. 154(b) by 457 days.

(21) Appl. No.: 12/428,521

(22) Filed: Apr. 23, 2009

(65) Prior Publication Data

US 2009/0268211 A1    Oct. 29, 2009

Related U.S. Application Data

(60) Provisional application No. 61/047,936, filed on Apr. 25, 2008.

(51) Int. Cl.
*G01B 9/02* (2006.01)

(52) U.S. Cl. ........................................................ 356/519
(58) Field of Classification Search .................. 356/480, 356/506, 519; 250/227.19, 227.27
See application file for complete search history.

(56) References Cited

U.S. PATENT DOCUMENTS

| 7,042,579 B2 * | 5/2006 | North Morris ................ 356/519 |
| 2003/0035120 A1 * | 2/2003 | Myatt et al. .................... 356/519 |

\* cited by examiner

*Primary Examiner* — Hwa Lee
(74) *Attorney, Agent, or Firm* — DeMont & Breyer, LLC (57) ABSTRACT

Embodiments of environmental stimulus sensors comprising multiple sources and detectors for interrogating one or more optically resonant cavities that are responsive to one or more environmental stimuli are disclosed. Such sensors have, among other advantages, improved immunity to source and/or detector noise.

8 Claims, 5 Drawing Sheets

OPTICAL INTERFEROMETRIC SENSOR

CROSS REFERENCE TO RELATED APPLICATIONS

This case claims priority to: U.S. Provisional Patent Application Ser. No. 61/047,936, filed Apr. 25, 2008, which is incorporated by reference.

In addition, the underlying concepts, but not necessarily the language, of the following cases are incorporated by reference:
 (1) U.S. patent application Ser. No. 12/122,342, filed May 16, 2008; and
 (2) U.S. patent application Ser. No. 11/460,626, filed Jul. 28, 2006; and
 (3) U.S. patent application Ser. No. 11/927,234, filed Oct. 29, 2007.

If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to displacement sensors in general, and, more particularly, to optical displacement sensors.

BACKGROUND OF THE INVENTION

Displacement sensors, such as microphones and pressure sensors, are well-known. Displacement sensors based on one or more of electrical capacitance, electrical impedance, or magnetic fields have been in use for many years. More recently, optical displacement sensors have been developed. Optical displacement sensors are particularly attractive as they overcome many of the limitations associated with other measurement techniques; limitations such as low sensitivity, the need for high-voltage biasing, poor electrical isolation, or response nonlinearities. Optical interferometers have been proven to have outstanding resolution when used as displacement detectors in physical sensing components, such as microphones, pressure sensors, and accelerometers.

Many optical-displacement sensors known in the prior art operate by detecting light reflected by an optical element that changes its reflectivity in response to an environmental stimulus, such as pressure differential, sound, vibration, etc. The detected light is converted into an electrical signal. This signal is a function of the reflectivity of the optical element, and, therefore, a function of the stimulus as well.

A Fabry-Perot interferometer has served as such an optical element. A Fabry-Perot interferometer is an optically resonant cavity that distributes optical energy of an input light signal into a reflected signal and a transmitted signal. The ratio of optical energy in the reflected and transmitted signals depends on the cavity length of the optically resonant cavity, which is the spacing between its two, substantially-parallel, partially reflective surfaces and its operating wavelength, $\lambda$, (i.e., the wavelength, $\lambda$, of the light on which the interferometer operates).

In order to form a Fabry-Perot interferometer that is sensitive to sound, etc., one surface of the Fabry-Perot interferometer is a surface of, or disposed on, a movable element. When the element moves in response to the environmental stimulus, the cavity length changes and, therefore, so does the ratio of optical energy in the reflected and transmitted signals. As a result, an electrical output signal based on one of the reflected and transmitted signals is a function of the environmental stimulus incident on the Fabry-Perot interferometer.

Unfortunately, interferometer-based sensors have some known drawbacks that limit their sensitivity. Source noise associated with a light source that provides the input signal to the interferometer can be very difficult to distinguish from a motion of the movable element. This reduces the signal-to-noise ratio (SNR) of a sensor. Similarly, detector noise associated with the photodetector that generates the electrical output signal can also reduce the SNR of the sensor. Further, the linear range of operation of a Fabry-Perot interferometer-based sensor is typically much less than the wavelength of light in the input signal.

A Fabry-Perot interferometer-based displacement sensor having high dynamic range and high sensitivity would be a significant advance in the art.

SUMMARY OF THE INVENTION

The present invention provides an optical interferometer that overcomes some of the disadvantages of the prior art. Embodiments of the present invention are particularly well-suited for use in applications such as accelerometers, microphones, gravity sensors, earthquake detectors, vibration sensors, and shock detectors.

In some embodiments, an optically resonant cavity is interrogated by an array of sources, each of which provides light having a first wavelength to the cavity. The light from each source that is reflected from the cavity is detected by one of a first array of photodetectors. The collective outputs of all these photodetectors provide an average reflected signal from the optically resonant cavity. In some embodiments, the light from each source that is transmitted by the cavity is detected by one of a second array of photodetectors. The collective outputs of all of these photodetectors provide an average transmitted signal from the optically resonant cavity. By averaging the reflected and/or transmitted signals received from the optically resonant cavity, the effect of noise associated with any one source is mitigated.

In some embodiments, each source in the source array provides light having a different wavelength. As a result, at least one of the source/detector pairs/trios can operate at a point of maximum sensitivity to changes in the cavity length of the optically resonant cavity. In some of these embodiments, an extended dynamic range is attained. In some embodiments, only some of the sources in the source array are operated at any given time thereby limiting power consumption of the sensor system.

In some embodiments, the source array is provided by an optical fiber-based splitter that splits the source light into the array of sources. In some embodiments, the plurality of source signals originates from a single spot and each signal is redirected toward the optically resonant cavity by a different lens of a lens array. In some of these embodiments, all of the light signals are incident on the optically resonant cavity at substantially the same position; thereby eliminating effects of angular misalignment of the cavity to the optical paths. In some embodiments, the source signal is split into multiple source signals in free space by means of a distributing device such as a diffraction grating, prism, dichroic filter, fixed beam slitter, and the like.

In some embodiments, an optical fiber bundle is used to provide source signals having different wavelengths to the optically resonant cavity. Such embodiments are suitable for operation in harsh environments where an active light source might be deleteriously affected. In some of these embodiments, different wavelength signals emanate from the same optical fiber.

In some embodiments, multiple light signals are directed toward a single lens that operates in pupil division mode. Each light signal is incident on the lens at a different distance from the optical central axis of the lens. As a result, each light signal is directed toward the optically resonant cavity at a slightly different angle. In such embodiments, at least one light signal can operate at an operating point that enables substantially maximum sensitivity.

In some embodiments, multiple sources of light are combined with multiple optically resonant cavities. A series stack of multiple optical cavities is formed wherein regions of the surfaces that define particular cavities are patterned to enable light to pass through unperturbed. At least one layer that comprises at least one surface of an optically resonant cavity is physically adapted to move in response to an environmental stimulus. Each optically resonant cavity that comprises a surface of this layer, therefore, has a cavity length that is based on the environmental stimulus. By virtue of patterning some or all of these surfaces, different light signals can interrogate individual optically resonant cavities.

An embodiment of the present invention comprises: a beam splitter having a first surface, wherein the beam splitter receives a plurality of input signals at the first surface and distributes the plurality of input signals into a plurality of first signals and a plurality of second signals that collectively define a plurality of signal pairs, and wherein the ratio of the first signal and second signal of each signal pair is based on a environmental stimulus; and a first plurality of photodetectors, wherein each of the first plurality of photodetectors generates one of a plurality of first electrical signals based on a different one of the plurality of first signals.

DETAILED DESCRIPTION

Figure 1:
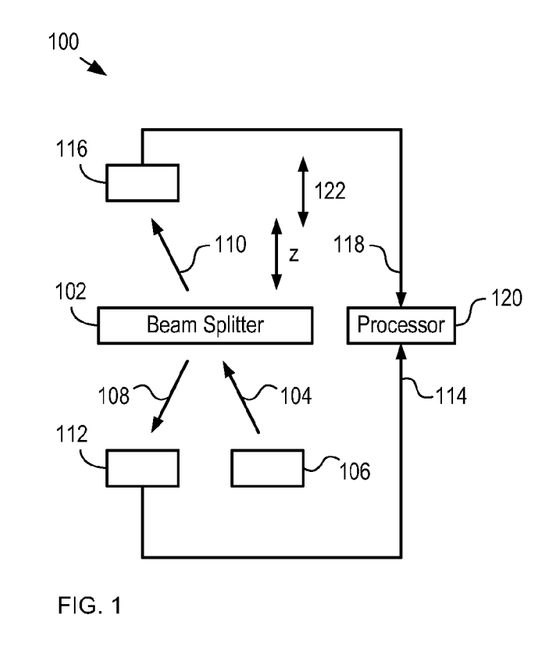
FIG. 1 depicts a schematic diagram of details of an environment stimulus sensor in accordance with an illustrative embodiment of the present invention.

FIG. 1 depicts a schematic diagram of details of an environment stimulus sensor in accordance with an illustrative embodiment of the present invention. Sensor 100 comprises beam splitter 102, source 106, detector 112, detector 116, and processor 120. Environmental stimulus sensor 100 provides an output signal based on acceleration 122, which applies to sensor 100 along the z-direction as shown. Although the illustrative embodiment is an acceleration sensor, it will be clear to one skilled in the art, after reading this specification, how to specify, make, and use alternative embodiments of the present invention that sense other environmental stimuli, such as vibration, acoustic energy, shock, and pressure.

Figure 2:
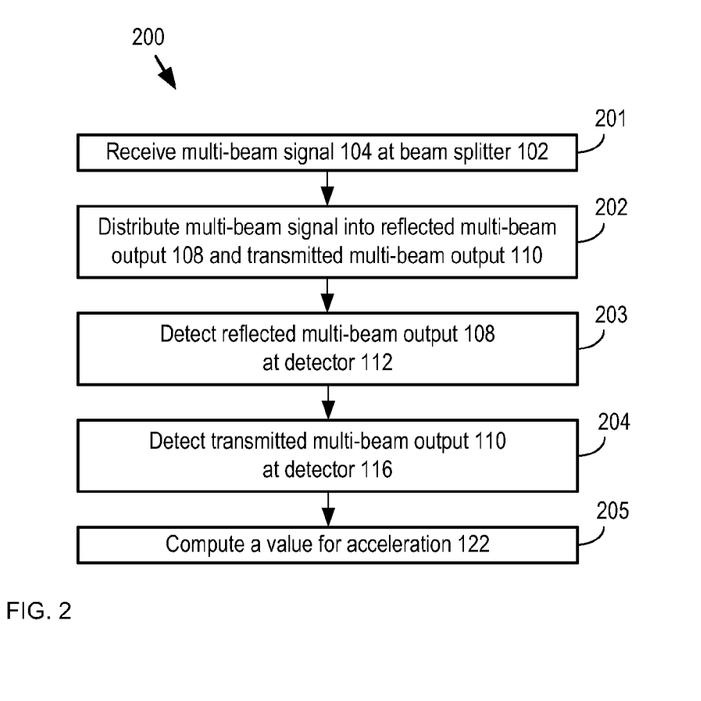
FIG. 2 depicts operations of a method for sensing an environmental stimulus in accordance with the illustrative embodiment.

FIG. 2 depicts operations of a method for sensing an environmental stimulus in accordance with the illustrative embodiment. FIG. 2 is described with continuing reference to FIG. 1. Method 200 begins with operation 201, wherein beam splitter 102 receives multi-beam signal 104 from source 106. Multi-beam signal 104 comprises a plurality of input signals 104-1 through 104-$n$, where n is the total number of input signals provided to beam splitter 102.

Figure 3A:
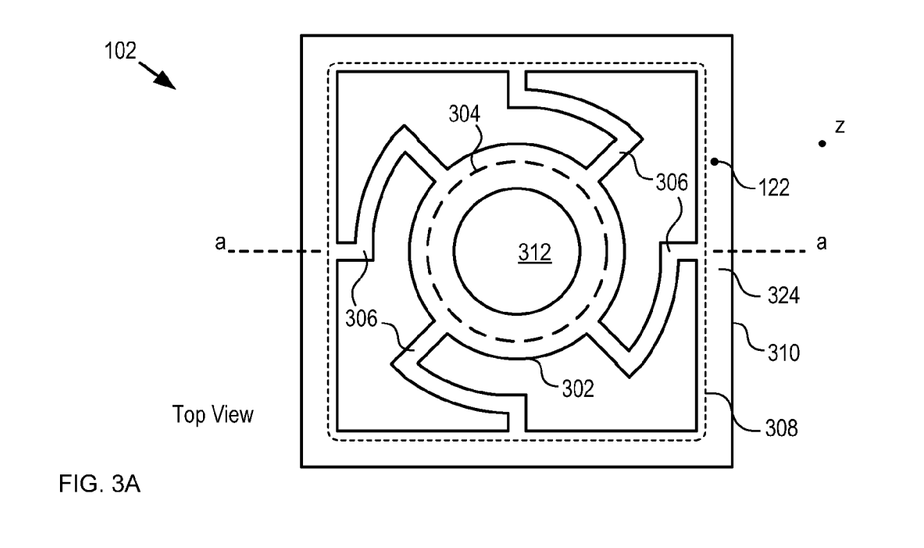
FIG. 3A depicts a top view of a beam splitter in accordance with the illustrative embodiment of the present invention.
Figure 3B:
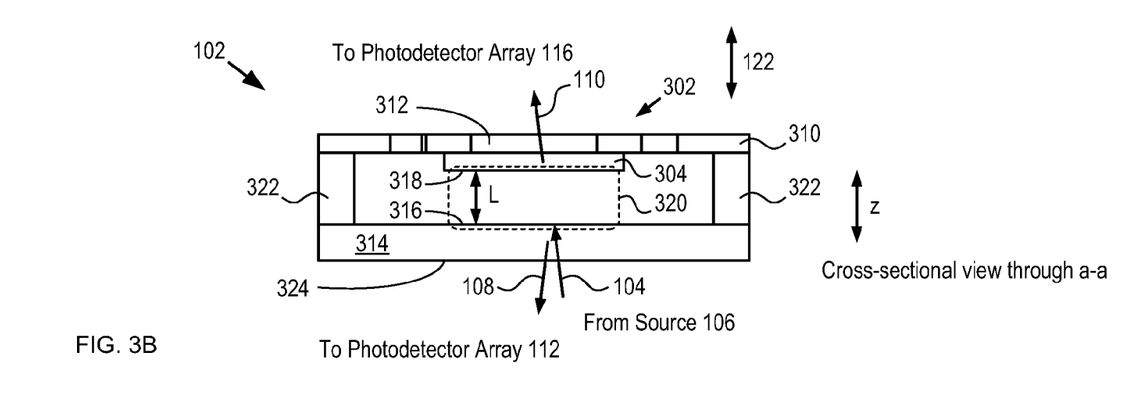
FIG. 3B depicts a cross-sectional view of a beam splitter in accordance with the illustrative embodiment of the present invention.

FIGS. 3A and 3B depict top and cross-sectional views of a beam splitter in accordance with the illustrative embodiment of the present invention. Other beam splitters suitable for use in the present invention have been disclosed in other patent applications filed by the present inventor, including U.S. patent application Ser. No. 11/278990, filed Apr. 7, 2006, and Ser. No. 11/421,593, filed Jun. 1, 2006, each of which is incorporated in its entirety by reference herein. Beam splitter 102 comprises plate 302, mirror 304, tethers 306, substrate 314, and spacer 322.

It should be noted that the design of beam splitter 102 is application dependent; therefore design parameters such as materials; layer thickness; the number, arrangement, and resiliency of tethers 306; initial cavity length; and the like, can be changed without deviating from the present invention.

Plate 302 is a central region of layer 310, which is a layer of metal having a thickness of approximately 200 microns. Plate 302 comprises optional through-hole 312, which enables egress of transmitted beam 116 from optically resonant cavity 320.

Plate 302 is held in position, relative to frame 324 by tethers 306. The four tethers 306 collectively define a support system for plate 302. Each of tethers 306 acts as a resilient member (i.e., spring) that enables plate 302 to move, relative to substrate 314, in response to a change in acceleration along the z-direction. Frame 324, tethers 306 and plate 302 are formed by removing portions of layer 310 via chemical etching. Plate 302 and tethers 306 collectively define shaped, movable membrane 308. In some embodiments, plate 302, through-hole 312, tethers 306, and frame 324 are formed out of layer 310 by a different suitable process, such as stamping, milling, photoetching, and the like. In some embodiments, membrane 308 is a continuous membrane and does not comprise a defined plate and/or tethers.

In some embodiments layer 310 is a layer of structural material that is cast into its desired shape that includes plate 302. Materials suitable for use in layer 310 include, without limitation, metals, ceramics, polymers, glasses, composite alloys, metallic alloys, graphite, dielectrics, and semiconductors.

In some embodiments, plate 302, tethers 306, and frame 324 are not formed out of a single layer. In some embodiments, plate 302, tethers 306, and frame 324 are discrete elements that are mechanically coupled to enable motion of plate 302 relative to substrate 312. In some embodiments, plate 302, tethers 306, and frame 324 form a non-membrane-like mass-spring system whose restoring force is dominated by one or more induced bending moments. In some embodiments, plate 302, tethers 306, and frame 324 are formed from one or more semiconductor and/or dielectric layers using Micro Electro Mechanical Systems (MEMS) technology.

Mirror 304 is mechanically coupled with plate 302. Mirror 304 is a plate of material that is at least partially transparent for multi-beam signal 104. In the illustrative embodiment, mirror 304 is a plate of borosilicate glass having a thickness of approximately 1 millimeter. Surface 318 of mirror 304 comprises a mirror layer that is partially reflective for each of input signals 104-1 through 104-$n$. Mirror layers suitable for use with mirror 304 include metal layers, dielectric layers, two-dimensional photonic bandgap layers, and the like. In some embodiments, mirror 304 also comprises an anti-reflection layer disposed on the surface proximate to plate 302 to mitigate the effects of reflections at this surface. Although the illustrative embodiment comprises a mirror that is a borosilicate glass plate, it will be clear to one skilled in the art, after reading this specification, how to make and use alternative embodiments of the present invention wherein mirror 304 comprises any material used in optical fabrication that is at least partially transparent for multi-beam signal 104. Suitable materials for use in mirror 304 include, without limitation, borosilicate glass, fused silica, dielectric layers, and the like.

Substrate 314 is a silicon dioxide layer having a thickness of approximately 2 millimeters. Substrate 314 comprises surface 316, which is partially reflective for each of input signals 104-1 through 104-$n$. Surface 324 of substrate 314 comprises an anti-reflection coating that minimizes the reflectivity of surface 324 for light in multi-beam signals 106, 108, and 110. In some embodiments of the present invention, substrate 314 is a material other than silicon. Suitable materials for substrate 314 include, without limitation, glass, III-V compound semiconductors, II-VI compound semiconductors, ceramics, and germanium. In some embodiments of the present invention, substrate 314 comprises an access hole and a suspended layer that comprises surface 316. In such embodiments, structural materials that are opaque to multi-beam signal 104, such as metals, etc., are suitable for use in substrate 314. It will also be clear to those skilled in the art, after reading this specification, how to make and use alternative embodiments of the present invention wherein substrate 314 has a thickness other than 2 millimeters and/or mirror 304 has a thickness other than 1 millimeter.

Spacers 322 are precision spacers that separate substrate 314 and layer 310. The thickness of spacers 322 determines the initial separation between surface 316 (of substrate 324) and surface 318 (of mirror 304). Surfaces 316 and 318 collectively define optically resonant cavity 320, which has a cavity length, L. Spacers 322 determine the initial cavity length of optically resonant cavity 320 (i.e., the value of L when plate 302 is in its quiescent position).

Spacer 322 is a precision ceramic spacer that has a thickness of approximately 3 millimeters and a cavity for receiving mirror 304. In some embodiments of the present invention, spacer 322 comprises a material other than ceramic. Suitable materials for spacers 218 include, without limitation, metals, silicon, germanium, epoxies, solder, silicon dioxide, glass, alumina, III-V compound semiconductors, and II-VI compound semiconductors. Although the illustrative embodiment comprises a spacer that has a thickness of approximately 3 millimeters, it will be clear to those skilled in the art, after reading this specification, how to make and use alternative embodiments of the present invention that comprises one or more spacers that have a thickness of other than 3 millimeters.

Figure 4:
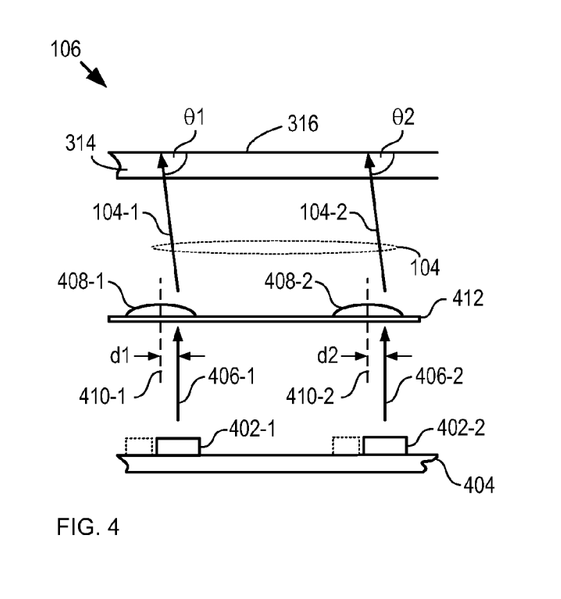
FIG. 4 depicts a schematic diagram of a multi-signal source in accordance with the illustrative embodiment of the present invention.

FIG. 4 depicts a schematic diagram of a multi-signal source in accordance with the illustrative embodiment of the present invention. Source 106 comprises lasers 402-1 and 402-2 and lenslets 408-1 and 408-2. Source 106 provides multi-beam signal 104, which comprises two input signals 104-1 and 104-2 (i.e., n is equal to 2). In some embodiments, source 106 provides a multi-beam signal 104 having more than two input signals. The number of input signals, n, in multi-beam signal 104 is dependent on system design and is limited only by practical considerations.

Each of lasers 402-1 and 402-2 (collectively referred to as lasers 402) is a vertical-cavity surface-emitting laser (VCSEL) that provides light when energized with an electric current. Lasers 402 are monolithically integrated on substrate 404. In some embodiments, at least one of lasers 402 is other than a VCSEL. Suitable sources for use in multi-signal source 106 include, without limitation, gas lasers, edge-emitting semiconductor lasers, wavelength-tunable lasers, filtered polychromatic light sources, super-luminescent light-emitting diodes, and the like. In some embodiments, each of lasers 402 is a discrete light source. It will be clear to one skilled in the art, after reading this specification, how to specify, make, and use lasers 402.

Laser 402-1 provides light signal 406-1 and laser 402-2 provides light signal 406-2. Each of the light beams contains substantially monochromatic light that is characterized by a wavelength suitable for operation with beam splitter 102. The light beams are typically characterized by a wavelength that is within the range of approximately 830 nanometers (nm) to approximately 860 nm, although any wavelength within the range of approximately 300 nm to approximately 1700 nm can be used. The spectral-width of the monochromatic light is typically less than one (1) nanometer. In the illustrative embodiment, each of light signals 406-1 and 406-2 are characterized by the same wavelength.

Lenslets 408-1 and 408-2 are refractive lenses disposed on lenslet substrate 412. Lenslets 408-1 and 408-2 and lenslet substrate 412 collectively define a lenslet array. Lenslet 408-1 receives light signal 406-1 at a distance d1 from optical axis 410-1. Lenslet 408-1 collimates the light signal to provide input signal 104-1. By virtue of the offset distance d1, lenslet 408-1 provides input signal 104-1 at an angle with respect to optical axis 408-1. As a result, input signal 104-1 is received at angle $\theta1$ with respect to surface 316 of beam splitter 102.

In similar fashion, lenslet 408-2 receives light signal 406-2 at a distance d2 from optical axis 410-2. Lenslet 408-2 collimates the light signal to provide input signal 104-2. By virtue of the offset distance d2, lenslet 408-2 provides input signal 104-2 at an angle with respect to optical axis 408-2. As a result, input signal 104-2 is received at angle $\theta2$ with respect to surface 316 of beam splitter 102.

In the illustrative embodiment, d1 and d2 are substantially equal; therefore, input signals 104-1 and 104-2 are received by surface 316 (and, therefore, optically resonant cavity 320) at the same angle. As a result, the effective cavity length [i.e., $L/\sin(\theta1)$] of optical cavity 320 for each of input signals 104-1 and 104-2 is the same.

Although the illustrative embodiment comprises lenslets that are refractive lenses, it will be clear to one skilled in the art, after reading this specification, how to specify, make, and use alternative embodiments of the present invention comprising lenslets that are other than refractive lenses. Suitable lens types for use in the present invention include, without limitation, diffractive lenses, holographic lenses, and the like.

In some embodiments, d1 and d2 are not the same distance; therefore, θ1 and θ2 are not the same angle.

Although in the illustrative embodiment, the input signals in multi-beam signal 104 are all characterized by the same wavelength and are all received by surface 316 at the same angle, it will be clear to one skilled in the art, after reading this specification, how to specify, make, and use alternative embodiments of the present invention wherein multi-beam signal 104 comprises:

i. a first input signal having a first wavelength and a second input signal having a second wavelength that is different than the first wavelength; or
ii. a plurality of input signals wherein each input signal has a different wavelength; or
iii. a first input signal that is received at surface 316 at a first angle and a second input signal that is received at surface 316 at a second angle that is different than the first angle; or
iv. a plurality of input signals wherein each input signal is received at surface 316 at a different angle; or
v. any combination of i, ii, iii, and iv.

At operation 202, beam splitter 102 distributes the optical energy of each of the plurality of input signals in multi-beam signal 104 into one of a plurality of reflected signals in reflected multi-beam output 108 and a corresponding one of a plurality of transmitted signals in transmitted multi-beam output 110. Each of the plurality of reflected signals and its corresponding transmitted signal collectively defines a different output signal pair. Specifically, the optical energy of input signal 104-1 into an output signal pair consisting of reflected signal 108-1 and transmitted signal 110-1. Further the optical energy of input signal 104-2 into an output signal pair consisting of reflected signal 108-2 and transmitted signal 110-2. Each output signal pair includes all of the optical energy of its corresponding input signal (neglecting optical loss).

Reflected signals 108-1 and 108-2 are reflected by beam splitter 102 at angles θ1 and θ2, respectively, to surface 316. In other words, reflected signals 108-1 and 108-2 are reflected by beam splitter 102 at substantially the same angles at which they were received at surface 316.

Transmitted signals 110-1 and 110-2 are transmitted by beam splitter 102 such that they propagate along the same direction as input signals 104-1 and 104-2. Since surface 318 is substantially parallel to surface 316, transmitted signals emanate from optically resonant cavity 320 at angles θ1 and θ2, respectively.

The ratio of optical energy in reflected signal 108-1 and transmitted signal 110-1 is based on the cavity length, L, of beam splitter 102, the wavelength of input signal 104-1, and the angle θ1 at which input signal 104-1 is received by beam splitter 102. In similar fashion, the ratio of optical energy in reflected signal 108-2 and transmitted signal 110-2 is also based on the cavity length, L, of beam splitter 102, the wavelength of input signal 104-2, and the angle θ2 at which input signal 104-2 is received by beam splitter 102. Since the wavelengths of the two signals are the same, and the angles with which they are received by surface 316 of beam splitter 102 are also the same, the distribution of the optical energy of input signal 104-1 into reflected signal 108-1 and transmitted signal 110-1 is the same as the distribution of the optical energy of input signal 104-2 into reflected signal 108-2 and transmitted signal 110-2.

Beam splitter 102 is oriented such that each of surfaces 116 and 118, which are substantially parallel with one another, is substantially orthogonal to the z-direction. A change in acceleration 122 induces a change in the position of mirror 304 along the z-direction, which changes the cavity length, L. As a result, the amount of optical energy in each of reflected signals 108-1 and 108-2 changes commensurately. In similar fashion, the amount of optical energy in each of transmitted signals 110-1 and 110-2 changes in equal and opposite fashion.

At operation 203, reflected multi-beam output 108 is detected at detector 112.

Figure 5:
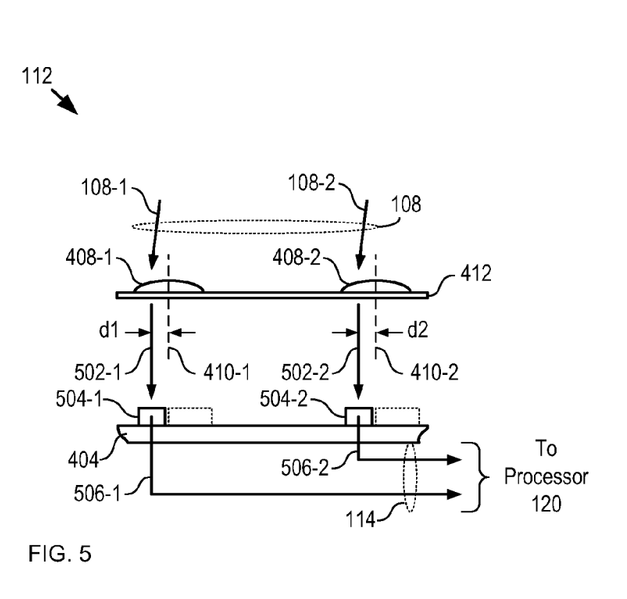
FIG. 5 depicts a schematic drawing of detector 112 in accordance with the illustrative embodiment of the present invention.

FIG. 5 depicts a schematic drawing of detector 112 in accordance with the illustrative embodiment of the present invention. Detector 112 is a multi-signal detector suitable for providing a plurality of electrical signals, wherein each electrical signal is based on a different one of the plurality of reflected signals in reflected multi-beam output 108. Detector 112 comprises n photodetectors (i.e., photodetectors 504-1 through 504-2) and n lenslets (i.e., lenslets 408-1 and 408-2).

Each of photodetectors 504-1 and 504-2 (collectively referred to as photodetectors 504) is a conventional photodetector suitable for providing an electrical signal whose magnitude is based on the intensity of light received by the photodetector. Photodetectors 504 are monolithically integrated on substrate 404, on which lasers 402 are disposed. In some embodiments, photodetectors 504 are discrete devices. In some embodiments, photodetectors 504 and lasers 402 are disposed on separate substrates. It will be clear to one skilled in the art, after reading this specification, how to specify, make, and use photodetectors 504.

Lenslets 408-1 and 408-2 are included in each of source 106 and detector 112. Lenslets 408-1 and 408-2 operate in pupil-division mode wherein each lenslet receives a light beam and a reflected signal, each displaced by the same distance on either side of the lenslet's optical axis. Each lenslet, therefore, "tilts" its received input beam and then substantially removes this induced tilt from its corresponding received reflected signal. This induces a physical separation between light beams 406-1 and 406-2 and their corresponding output signals 502-1 and 502-2. As a result, lasers 402 and photodetectors 504 can be monolithically integrated on substrate 404. In some embodiments, lenslets 408 are not included in detector 112.

Photodetector 504-1 receives output signal 502-1 and produces electrical signal 506-1. In similar fashion, photodetector 504-2 receives output signal 502-2 and produces electrical signal 506-2. Electrical signals 506-1 and 506-2 are provided to processor 120 as electrical signal 114.

At operation 204, transmitted multi-beam output 110 is detected at detector 116.

Figure 6:
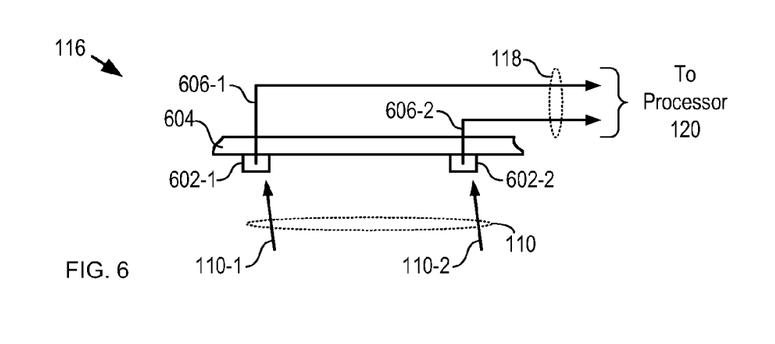
FIG. 6 depicts a schematic drawing of detector 116 in accordance with the illustrative embodiment of the present invention.

FIG. 6 depicts a schematic drawing of detector 116 in accordance with the illustrative embodiment of the present invention. Detector 116 is a multi-signal detector suitable for providing a plurality of electrical signals, wherein each electrical signal is based on a different one of the plurality of reflected signals in reflected multi-beam output 110. Detector 116 comprises n photodetectors (i.e., photodetectors 602-1 through 602-2).

Each of photodetectors 602-1 and 602-2 (collectively referred to as photodetectors 602) is a conventional photodetector suitable for providing an electrical signal whose magnitude is based on the intensity of light received by the photodetector. Photodetectors 602 are analogous to photodetectors 504. Photodetectors 602 are monolithically integrated on substrate 604. In some embodiments, photodetectors 602 are discrete devices.

Photodetector 602-1 receives output signal 110-1 and produces electrical signal 606-1. In similar fashion, photodetector 602-2 receives output signal 110-2 and produces electrical signal 606-2. Electrical signals 606-1 and 606-2 are provided to processor 120 as electrical signal 118.

At operation 205, processor 120 computes a value for acceleration 122 based on electrical signals 114 and 118. A change in cavity length, L, of beam splitter 102 has substantially equal and opposite effect on reflected multi-beam output 108 and transmitted multi-beam output 110. By computing a value for an environmental stimulus based on both of electrical signals 114 and 118, therefore, the sensitivity of sensor 100 is greatly enhanced (by as much as a factor of 2) over environmental sensors of the prior-art.

In some embodiments, processor 120 averages electrical signals 506-1 and 506-2 to develop an average value for reflected multi-beam output 108. By averaging the values of its constituent signals, the deleterious impact of noise due to any one constituent signal can be mitigated. In the illustrative embodiment, for example, since each of input signals 104-1 and 104-2 is provided by a different light source, source noise from either of lasers 402-1 and 402-2 has less negative impact on SNR of the output of sensor 100. In similar fashion, averaging electrical signals 506-1 and 506-2 mitigates the impact of detector noise on the SNR of sensor 100 from either of photodetectors 504-1 and 504-2.

In some embodiments, processor 120 computes a value for an environmental stimulus based on only one of electrical signals 114 and 118.

In some embodiments, source 106 provides input signals to beam splitter 102 wherein the input signals are characterized by different wavelengths. For example, in some embodiments, lasers 402-1 and 402-2 provide light signals that are characterized by different wavelengths. In such embodiments, even though $\theta 1$ and $\theta 2$ are the same angle, the distribution of the optical energy of input signal 104-1 into reflected signal 108-1 and transmitted signal 110-1 will differ from the distribution of the optical energy of input signal 104-2 into reflected signal 108-2 and transmitted signal 110-2. As a result, sensor 100 can be designed such that at least one of the different output signal pairs exhibits maximum sensitivity to the environmental stimulus being detected. As a result, the dynamic range of sensor 100 is extended. In some of these embodiments, a subset of the light sources in source 106 is energized at any given time; therefore, overall power consumption of sensor 100 is reduced.

Figure 7:
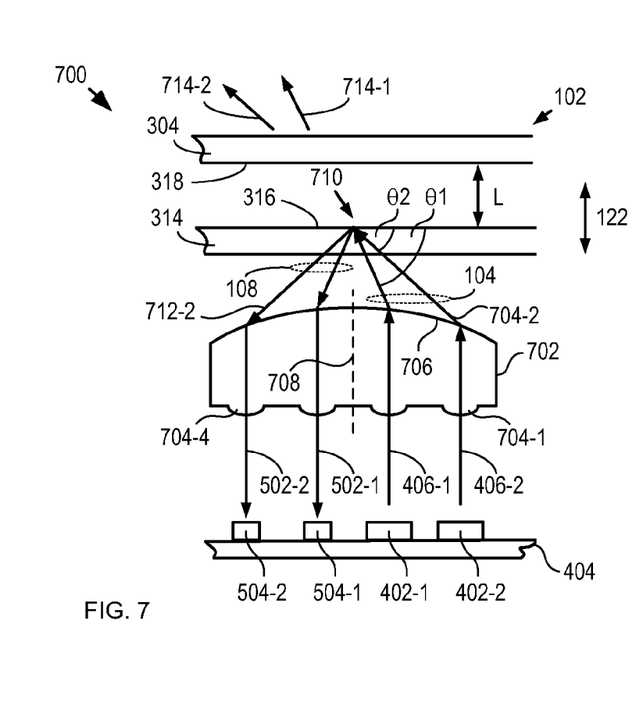
FIG. 7 depicts a schematic diagram of an optical system in accordance with a first alternative embodiment of the present invention.

FIG. 7 depicts a schematic diagram of an optical system in accordance with a first alternative embodiment of the present invention. System 700 comprises lasers 402-1 and 402-2, lens 702, and photodetectors 504-1 and 504-2. System 700 provides multi-beam signal 104, which comprises two input signals 704-1 and 704-2 (i.e., n is equal to 2). In some embodiments, system 700 provides a multi-beam signal 104 having more than two input signals.

Lens 702 is a compound refractive lens that includes a plurality of lenslets 704-1 through 704-4, which are disposed on a first surface. Lens 702 further comprises convex surface 706, which opposes the first surface.

Figure 8:
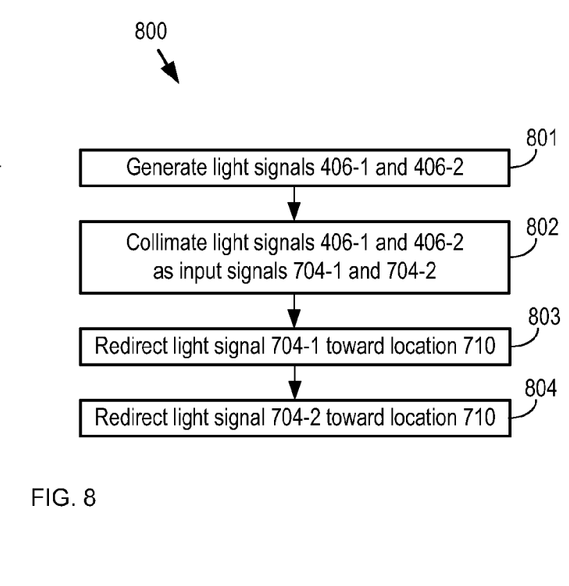
FIG. 8 depicts sub-operations of operation 201 suitable for providing multi-beam signal 104 at beam splitter 102 in accordance with the first alternative embodiment of the present invention.

FIG. 8 depicts sub-operations of operation 201 suitable for providing multi-beam signal 104 at beam splitter 102 in accordance with the first alternative embodiment of the present invention. Method 800 begins with sub-operation 801, wherein light signals 406-1 and 406-2 are generated by energizing lasers 402-1 and 402-2.

At sub-operation 802, lenslets 704-1 and 704-2 receive light signals 406-1 and 406-2, respectively. Lenslet 704-1 collimates light signal 406-1 and lenslet 704-2 collimates light signal 406-2.

At sub-operation 803, convex surface 706 receives collimated light signal 406-1 and redirects it toward location 710 as input signal 704-1. Input signal 704-1 propagates toward location 710 at a first angle to optical axis 708. The magnitude of the first angle is dependent on the distance of lenslet 704-1 from optical axis 708.

At operation 804, convex surface 706 receives collimated light signal 406-2 and redirects it toward location 710 as input signal 704-2. Input signal 704-2 propagates toward location 710 at a second angle to optical axis 708. The magnitude of the second angle is dependent on the distance of lenslet 704-2 from optical axis 708.

Since lenslet 704-1 is at a greater distance from optical axis 708 than lenslet 704-2, the first angle is larger than the second angle. As a result, input signals 704-1 and 704-2 are each received at substantially the same location (i.e., location 710) on beam splitter 102. Input signal 704-1 is received at surface 316 at angle $\theta 1$ with respect to surface 316. Input signal 704-2 is received at surface 316 at angle $\theta 2$ with respect to surface 316.

It should be noted that for convenience, location 710 is depicted in FIG. 7 as a position on surface 316 of beam splitter 102; however, one skilled in the art will recognize that location 710 could be located on either of surface 316 or 318 or anywhere in between these two surfaces.

As described above, and with respect to FIGS. 1-6, beam splitter 102 distributes the optical energy of input signal 704-1 into reflected signal 712-1 and transmitted signal 714-1 based on cavity length L. Beam splitter 102 also distributes the optical energy of input signal 704-2 into reflected signal 712-2 and transmitted signal 714-2 based on cavity length L. Cavity length L is based on acceleration 122.

System 700 directs each of the plurality if input signals to substantially the same location on beam splitter 102; however, each of the input signals is received by beam splitter 102 at a different angle with respect to the beam splitter (i.e., surface 316). As a result, each input signal is subject to a slightly different effective cavity length. System 700 can be arranged, therefore, so that beam splitter 102 operates with nearly optimal responsivity for at least one of the plurality of input signals. This enables sensor 100 to operate with sensitivity that is markedly improved over those of environmental stimulus sensors in the prior-art. Further, since all input signals are incident on beams splitter 102 at substantially the same location, system 700 enables sensor 100 to operate with decreased sensitivity to component misalignments, such as angular misalignments between beam splitter 102 and sources 402-1 and 402-2, etc.

Figure 9:
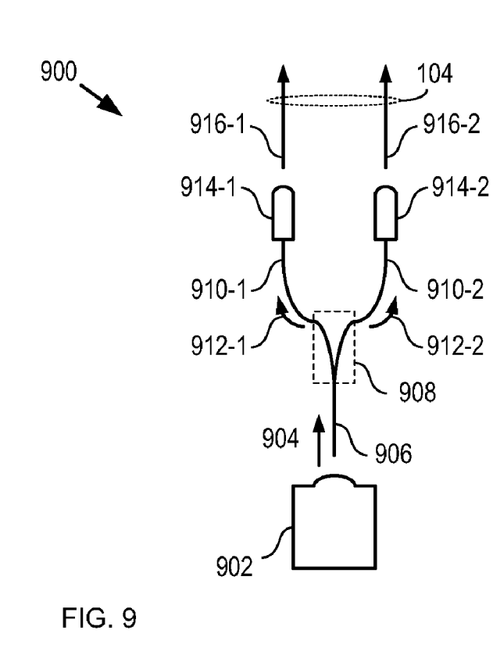
FIG. 9 depicts a schematic representation of a multi-signal source in accordance with a second alternative embodiment of the present invention.

FIG. 9 depicts a schematic representation of a multi-signal source in accordance with a second alternative embodiment of the present invention. Source 900 comprises laser 902, input fiber 906, distributor 908, output fibers 910-1 and 910-2, and lenses 914-1 and 914-2.

Laser 902 is a VCSEL laser that comprises an integrated collimating lens. Laser 902 is substantially analogous to laser 402-1, although laser 902 emits a collimated beam of light rather than a non-collimated light signal.

Laser 902 emits collimated light, which is coupled into input fiber 906 as optical input 904.

Distributor 908 is an optical fiber fusion coupler having a 50/50 split ratio. Distributor 908 evenly distributes the optical energy in optical input 904 into guided signals 912-1 and 912-2, which propagate through output fibers 910-1 and 910-2, respectively. Optical fibers 910-1 and 910-2 are terminated with lenses 914-1 and 914-2, respectively. In some embodiments, distributor 908 is other than an optical fiber fusion coupler. Suitable devices for use in distributor 908 include, without limitation, waveguide couplers, free-space gratings, free-space beam splitters, dichroic beam splitters, prisms, and diffraction gratings.

Each of lenses 914-1 and 914-2 is a graded-index (GRIN) lens suitable for launching a guided signal into free-space as a collimated light beam. Lens 914-1 launches guided signal 912-1 into free-space as collimated input signal 916-1. Lens 914-2 launches guided signal 912-2 into free-space as collimated input signal 916-2. Input signals 916-1 and 916-2 collectively define multi-beam signal 104.

Source 900 enables sensor 100 to operate in harsh environments, since multi-beam signal 104 can be generated remotely and conveyed to the sensor over optical fibers. It should be noted that any of the sources and detectors suitable for use in the present invention are amenable to generation and/or detection using light sources and/or detectors located remotely. These sources/detectors can be optically coupled to beam splitter 102 by means of optical fibers.

Further, the use of optical fibers to optically couple light sources with beam splitter 102 enables the use of a plurality of input signals that are characterized by different wavelengths, wherein all of the plurality of input signals are incident on beam splitter 102 at substantially the same location.

Figure 10:
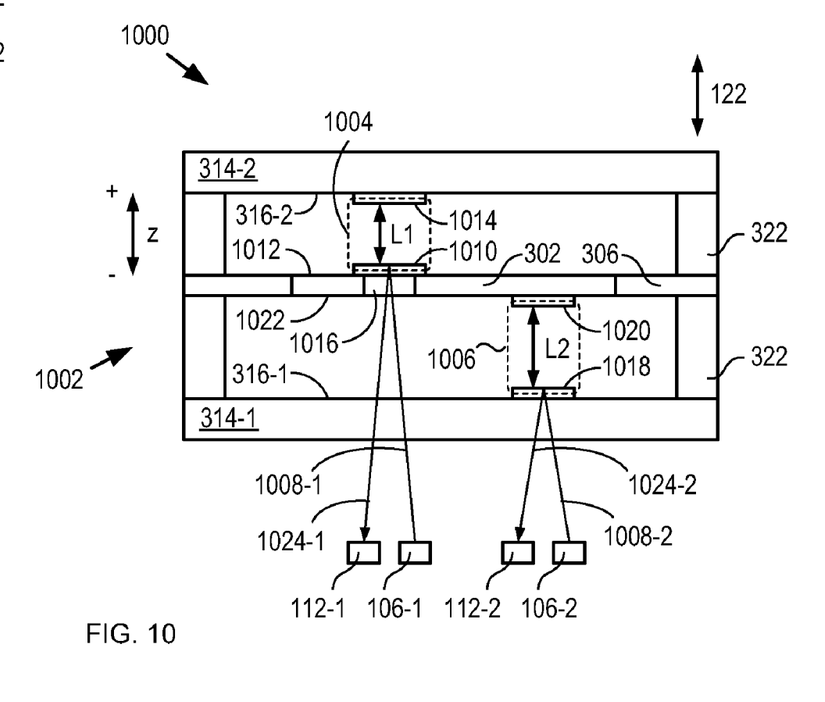
FIG. 10 depicts a schematic diagram of an environmental sensor in accordance with a third alternative embodiment of the present invention.

FIG. 10 depicts a schematic diagram of an environmental sensor in accordance with a third alternative embodiment of the present invention. Sensor 1000 comprises beam splitter 1002, multi-beam sources 106-1 and 106-2, and detectors 504-1 and 504-2.

Beam splitter 1002 comprises substrates 314-1 and 314-2, supports 322, plate 302, tethers 306, and mirrors 1010, 1014, 1018, and 1020. Beam splitter 1002 is analogous to a back-to-back arrangement of two beam splitters 102, described above and with respect to FIGS. 3A and 3B.

Mirrors 1010 and 1014 collectively define optically resonant cavity 1004. Optically resonant cavity 1004 is analogous to optically resonant cavity 320. Optically resonant cavity 1004 receives multi-beam signal 1008-1 from source 106-1. Multi-beam signal 1006-1 is analogous to multi-beam signal 104.

Optically resonant cavity 1004 is defined by mirrors 1010 and 1014. Each of mirrors 1010 and 1014 is a layer of material that is partially reflective for multi-beam signal 1008-1. The separation between mirrors 1010 and 1014 defines cavity length L1. Access to optically resonant cavity 1004 for multi-beam signal 1008-1 is provided by hole 1016, which is formed in plate 302.

Mirror 1020 is disposed on surface 1022 of plate 302. Plate 302 is enabled to move in response to a change in acceleration 122. As a result, L1 is based on an acceleration along the z-direction that is applied to sensor 1000.

Mirrors 1018 and 1020 collectively define optically resonant cavity 1006. Each of mirrors 1018 and 1020 is a layer of material that is partially reflective for multi-beam signal 1008-2. The separation between mirrors 1018 and 1020 defines cavity length L2.

Mirror 1020 is disposed on surface 1022 of plate 302; therefore, L2 is based on acceleration 122.

A change in acceleration 122 induces equal and opposite changes in cavity lengths L1 and L2. For example, an increase in acceleration 122 along the positive direction, as shown, induces plate 302 to move toward substrate 312-1. This increases L1 and decreases L2 by the same amount. As a result, beam splitter 1002 provides sensor 1000 with enhanced sensitivity (by a factor of 2) for a change in acceleration along the z-direction. Further, a diversity of optical sources and detectors affords sensor 1000 with greater immunity to source and detector noise. Still further, by changing the angle at which one of the multi-beam signals 1008-1 and 1008-2 is incident on its respective optically resonant cavity, and/or changing the quiescent value for one of L1 and L2, the dynamic range of sensor 1000 can be increased.

In some embodiments, optically resonant cavities 1004 and 1006 are not operatively coupled through plate 302. In some of these embodiments, each optically resonant cavity is sensitive to a different environmental stimulus; therefore, such embodiments enable detection and measurement of multiple environmental stimuli.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   receiving a plurality of input signals at a first surface of a beam splitter, wherein the beam splitter comprises a physical adaptation for distributing each of the plurality of input signals into a first signal and a second signal based on an environmental stimulus;
   distributing the plurality of input signals into a plurality of first signals and a plurality of second signals, wherein the plurality of first signals and the plurality of second signals collectively define a plurality of signal pairs, and wherein each of the plurality of signal pairs corresponds to a different one of the plurality of input signals;
   generating a plurality of first electrical signals, wherein each of the plurality of first electrical signals is based on a different one of the plurality of first signals; and
   computing a value for the environmental stimulus based on the plurality of first electrical signals.

2. The method of claim 1 further comprising generating a plurality of second electrical signals, wherein each of the plurality of second electrical signals is based on a different one of the plurality of second signals, and wherein the computed value for the environmental stimulus is further based on the plurality of second electrical signals.

3. The method of claim 1 further comprising providing the plurality of input signals to the beam splitter, wherein the beam splitter receives each of the plurality of input signals at the same location, and wherein each of the plurality of input signals is received at a different angle to the first surface.

4. The method of claim 1 wherein each of the plurality of input signals is received at a different location on the first surface, and wherein each of the plurality of input signals is received at a different angle to the first surface.

5. The method of claim 1 wherein each of the plurality of input signals is received at a different location on the first surface, and wherein each of the plurality of input signals is received at substantially the same angle to the first surface.

6. The method of claim 1 further comprising providing the plurality of input signals, wherein each of the plurality of input signals is characterized by a different wavelength.

7. The method of claim 1 further comprising providing the plurality of input signals, wherein each of the plurality of input signals is provided by a different one of a plurality of light sources.

8. The method of claim 1 further comprising providing the plurality of input signals by operations comprising:
   providing a first light signal; and
   distributing the first light signal to form the plurality of input signals.

\* \* \* \* \*